(12) United States Patent
Pan et al.

(10) Patent No.: US 12,154,307 B2
(45) Date of Patent: Nov. 26, 2024

(54) INTERPRETABILITY-AWARE REDUNDANCY REDUCTION FOR VISION TRANSFORMERS

(71) Applicants: International Business Machines Corporation, Armonk, NY (US); Massachusetts Institute of Technology, Cambridge, MA (US)

(72) Inventors: Bowen Pan, Cambridge, MA (US); Rameswar Panda, Medford, MA (US); Rogerio Schmidt Feris, West Hartford, CT (US); Aude Jeanne Oliva, Cambridge, MA (US)

(73) Assignees: International Business Machines Corporation, Armonk, NY (US); Massachusetts Institute of Technology, Cambridge, MA (US)

( * ) Notice: Subject to any disclaimer, the term of this patent is extended or adjusted under 35 U.S.C. 154(b) by 405 days.

(21) Appl. No.: 17/559,053

(22) Filed: Dec. 22, 2021

(65) Prior Publication Data
US 2023/0196710 A1    Jun. 22, 2023

(51) Int. Cl.
*G06V 10/26* (2022.01)
*G06N 3/08* (2023.01)
(Continued)

(52) U.S. Cl.
CPC .............. *G06V 10/26* (2022.01); *G06N 3/08* (2013.01); *G06T 7/11* (2017.01); *G06T 7/136* (2017.01);
(Continued)

(58) Field of Classification Search
None
See application file for complete search history.

(56) References Cited

U.S. PATENT DOCUMENTS 8,948,454 B2   2/2015  Datta et al.
10,169,661 B2  1/2019  Bobbitt et al.
(Continued)

FOREIGN PATENT DOCUMENTS

CN   107633236 B   1/2019
CN   109190505 A   1/2019
(Continued)

OTHER PUBLICATIONS

Dosovitskiy, A. et al. (2020). An Image is Worth 16×16 Words: Transformers for Image Recognition at Scale. arXiv.Org. https://doi.org/10.48550/arxiv.2010.11929 (Year: 2020).*
(Continued)

*Primary Examiner* — Amandeep Saini
*Assistant Examiner* — Caroline Tabancay Duffy
(74) *Attorney, Agent, or Firm* — Scully, Scott, Murphy & Presser, P.C.; Daniel P. Morris

(57) ABSTRACT

A sequence of patch tokens representing an image can be received. A network can be trained to learn informative patch tokens and uninformative patch tokens in the sequence of patch tokens, in learning to recognize an object in the image. The sequence of patch tokens can be reduced by removing the uninformative patch tokens from the sequence of patch tokens. The reduced sequence of patch tokens can be input to an attention-based deep learning neural network. The attention-based deep learning neural network can be fine-tuned to recognize the object in the image using the reduced sequence of patch tokens.

20 Claims, 9 Drawing Sheets

(51) Int. Cl.
*G06T 7/11* (2017.01)
*G06T 7/136* (2017.01)

(52) U.S. Cl.
CPC ............... *G06T 2207/20081* (2013.01); *G06T 2207/20084* (2013.01)

(56) References Cited

U.S. PATENT DOCUMENTS

| | | | |
|---|---|---|---|
| 10,242,266 | B2 | 3/2019 | Jones et al. |
| 2018/0314911 | A1* | 11/2018 | Eldar .................... G06T 7/11 |
| 2022/0188573 | A1* | 6/2022 | Liu ..................... G06V 20/695 |
| 2022/0398719 | A1* | 12/2022 | Song ..................... G16H 10/40 |
| 2023/0153379 | A1* | 5/2023 | Fayyaz .................. G06N 3/082 |
| | | | 382/158 |

FOREIGN PATENT DOCUMENTS

| | | |
|---|---|---|
| CN | 112133428 A | 12/2020 |
| CN | 113191961 A | 7/2021 |
| WO | 2014102428 A1 | 7/2014 |
| WO | 2020141812 A1 | 7/2020 |

OTHER PUBLICATIONS

Kargar, Eshagh, and Ville Kyrki. "Vision transformer for learning driving policies in complex multi-agent environments." arXiv preprint arXiv:2109.06514 (2021). (Year: 2021).*

Liu, Z., et al., "Swin Transformer: Hierarchical Vision Transformer Using Shifted Windows", arXiv:2103.14030v2 [cs.CV], Aug. 17, 2021, 14 pages.

Bertasius, G., et al., "Is Space-Time Attention All You Need for Video Understanding?", arXiv:2102.05095v4 [cs.CV], Jun. 9, 2021, 13 pages.

Touvron, H., et al., "Training data-efficient image transformers & distillation through attention", arXiv:2012.12877v2 [cs.CV], Jan. 15, 2021, 22 pages.

Dosovitskiy, A., et al., "An image is worth 16×16 words: Transformers for image recognition at scale", arXiv:2010.11929v2 [cs.CV], Jun. 3, 2021, 22 pages.

Wang, W., et al., "Pyramid Vision Transformer: A Versatile Backbone for Dense Prediction without Convolutions", arXiv:2102.12122v2 [cs.CV], Aug. 11, 2021, 15 pages.

NIST, "NIST Cloud Computing Program", http://csrc.nist.gov/groups/SNS/cloud-computing/index.html, Created Dec. 1, 2016, Updated Oct. 6, 2017, 9 pages.

Williams, R.J., "Simple Statistical Gradient-Following Algorithms for Connectionist Reinforcement Learning", Machine Learning, 1992, pp. 229-256, 8.

Pan, B., et al., "IA-RED2: Interpretability-Aware Redundancy Reduction for Vision Transformers", arXiv:2106.12620v1 [cs.CV], Jun. 23, 2021, 16 pages (Grace Period Disclosure).

Pan, B., et al., "IA-RED2: Interpretability-Aware Redundancy Reduction for Vision Transformers", arXiv:2106.12620v2 [cs.CV], Oct. 26, 2021, 19 pages (Grace Period Disclosure).

* cited by examiner

INTERPRETABILITY-AWARE REDUNDANCY REDUCTION FOR VISION TRANSFORMERS

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S): IA-RED$^2$: Interpretability-Aware Redundancy Reduction for Vision Transformers, Bowen Pan, Rameswar Panda, Yifan Jiang, ZhangyangWang, Rogerio Feris, Aude Oliva, arXiv:2106.12620v2 [cs.CV] 23 Jun. 2021 and 26 Oct. 2021.

BACKGROUND

The present application relates generally to computers and computer applications, and more particularly to machine learning, transformers and computer vision.

Transformer architecture has led to a leap forward in capabilities for sequence-to-sequence modeling in natural language processing (NLP) tasks, and recently the vision transformer (ViT) also demonstrates comparative results to convolutional neural network (CNN)-based models. ViT follows NLP process that splits an image into patch tokens and adds an extra class token (CLS) as the input sequence. Then, all tokens are passed through the stacked transformer encoders. Still, the vision transformer can incur heavy computational costs especially when the input sequence is long. As the attention module in the vision transformer computes the fully connected relations among all the input patches, the computational cost can then be quadratic with respect to the length of the input sequence. Further, for interpretability, raw attention from the architecture may not perceive the informative region of the input images.

BRIEF SUMMARY

The summary of the disclosure is given to aid understanding of a computer system and method of interpretability-aware redundancy reduction in transformers, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method, in an aspect, can include receiving a sequence of patch tokens representing an image. The method can also include training a network to learn informative patch tokens and uninformative patch tokens in the sequence of patch tokens, in learning to recognize an object in the image. The method can further include reducing the sequence of patch tokens by removing the uninformative patch tokens from the sequence of patch tokens. The method can also include inputting the reduced sequence of patch tokens to an attention-based deep learning neural network. The method can further include fine-tuning the attention-based deep learning neural network to recognize the object in the image using the reduced sequence of patch tokens.

A system, in an aspect, can include a processor and a memory device coupled with the processor. The processor can be configured to receive a sequence of patch tokens representing an image. The processor can also be configured to train a network to learn informative patch tokens and uninformative patch tokens in the sequence of patch tokens, in learning to recognize an object in the image. The processor can also be configured to reduce the sequence of patch tokens by removing the uninformative patch tokens from the sequence of patch tokens. The processor can also be configured to input the reduced sequence of patch tokens to an attention-based deep learning neural network. The processor can also be configured to fine-tune the attention-based deep learning neural network to recognize the object in the image using the reduced sequence of patch tokens.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one or more embodiments, systems, methods, and techniques for interpretability-aware redundancy reduction framework for vision transformer can be provided. The framework, in an embodiment is an input-dependent dynamic inference framework for the vision transformer, which can adaptively decide the patch tokens to compute per input instance. The framework can be applicable to any types of models and any types of tasks such as image processing (e.g., classifying objects in an image), video processing (e.g., classifying actions in the video) and natural language processing.

In one or more embodiment, redundant computation, e.g., spent on uncorrelated input patches, can be observed. An interpretable module can then dynamically drop these redundant patches. The framework can be extended to a hierarchical structure, where uncorrelated tokens at different stages are gradually removed, resulting in a considerable shrinkage of computational cost. The framework can apply to both image and video tasks. For example, the framework can include multi-head interpreters, which serve as an interpretable module, which are built on top of transformer-based backbones for different tasks. Examples of different tasks can include, but are not limited to, image recognition and video action recognition.

Figure 1:
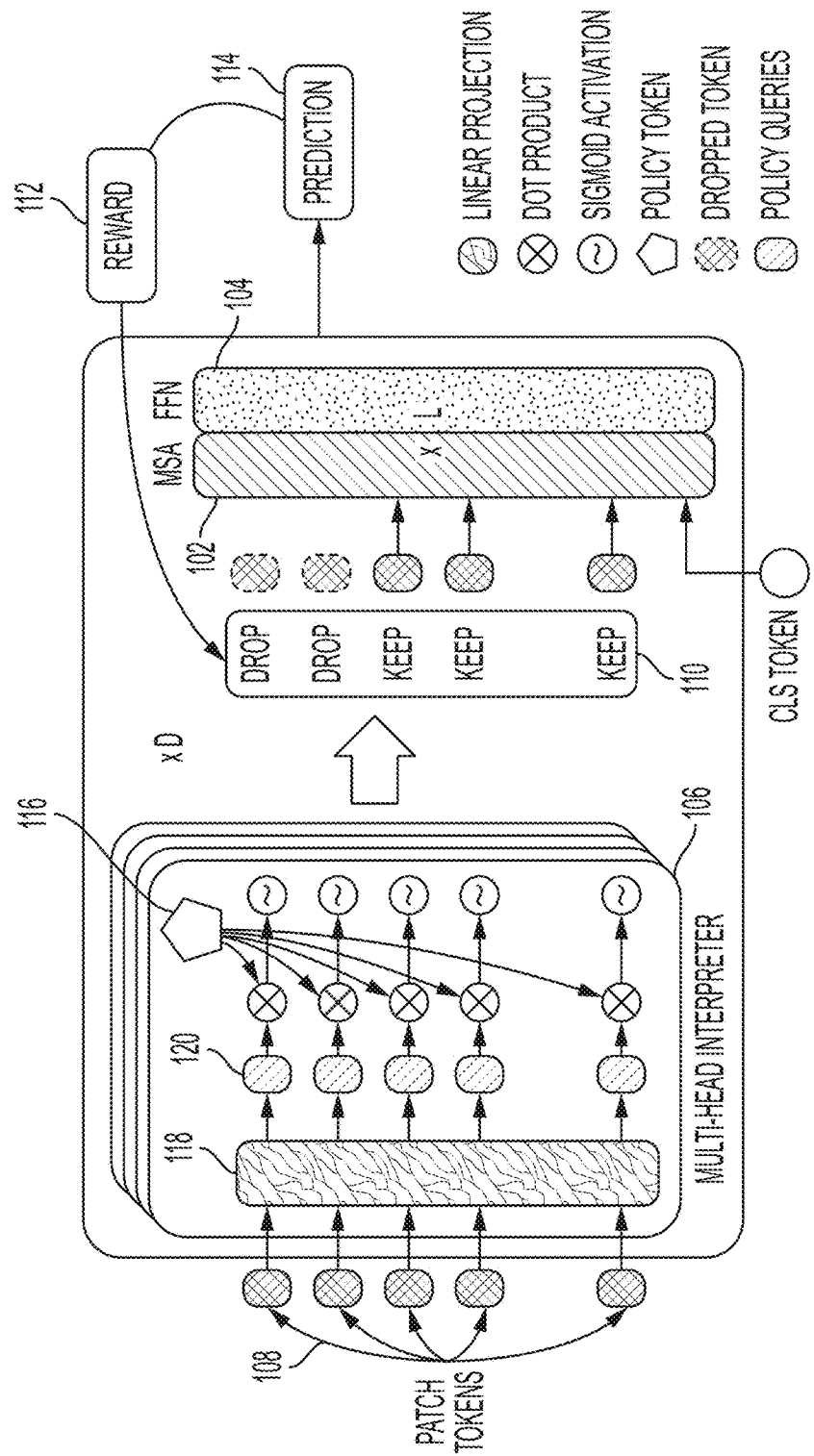
FIG. 1 is a diagram illustrating an interpretability-aware redundancy reduction framework in an embodiment.

FIG. 1 is a diagram illustrating an interpretability-aware redundancy reduction framework in an embodiment. The components shown include computer-implemented components, for instance, implemented and/or run on one or more computer processors, including, for example, one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

In an embodiment, the framework can include vision transformers. Transformers have neural network architecture with attention-based mechanism. For instance, a transformer architecture can include multi-headed self-attention (MSA) 102 and feed forward network (FFN) 104, for example, implemented or used in existing transformer architecture, for sequence-to-sequence (seq-to-seq) modeling. For example, a set of tokens and a classification token (CLS) can be received as input, and a transformer model processes the tokens. Such transformers can be extended to computer vision. For example, an image can be divided into patches of images as tokens, and the patches passed to a transformer to classify into different classes. For instance, the attention module in the vision transformer computes the fully connected relations among all of the input patches passed to it.

In an embodiment, the framework which can provide interpretability-aware redundancy reduction can include a plurality of multi-headed interpreters 106 to learn and determine patches of an image, which are considered informative for classifying the image. For example, certain patches in the image may be determined to be unimportant for classifying the image. Such patches can be learned and removed as being redundant. Such removal can improve the computation efficiency. For instance, consider an image showing object against a background scene. For a task of recognizing the object, the patches that show the background information may not be needed. The framework learns which patches are uninformative for a particular task and removes those patches from classification computation or transformer encoding. In an aspect, the amount of redundancy depends on input, and learning of which patch tokens to keep and which patch tokens to remove can be done with any model, and any task or input type.

For instance, the framework can increase computation efficiency (and thus reduce the need for computing power) by dynamically dropping less informative patches in the original input sequence so that the length of the input sequence could be reduced. As the computational complexity of the attention module can be quadratically linear to the input sequence length, the effect of reducing input sequence length would be magnified in the amount of the computation.

Referring back to FIG. 1, the multi-head interpreter 106, e.g., a policy network, can decide which patches are uninformative and then discard them. Such mechanism can be interpretability-aware as the policy network learns to distinguish which region is contributing to the final prediction results. In an embodiment, the framework may predict the heatmap visualization that precisely indicates the objects or contexts of relevance. The framework can adaptively decide the patch tokens to compute per input instance.

In an embodiment, the framework can reduce the redundancy in vision transformers by dynamically dropping less informative patches in the original input sequence while classifying it correctly with the minimum computation. In an embodiment, a module or a methodology of dynamically dropping some patches can be built on top of vision transformer (ViT). The framework can hierarchically reduce the redundant patch tokens at different layers of the vision transformer.

FIG. 1 shows one block of a transformer with multi-headed self-attention 102 and feed forward network 104. There can be D number of such blocks. Multi-head interpreter 106 receives input tokens, e.g., patches of images, 108 and outputs a vector 110, e.g., binary vector of zeroes and ones, indicating which patches to keep and which patches to remove, for the transformer encoding or processing for prediction 114, e.g., by MSA 102 and FFN 104. In an embodiment, the multi-head interpreter 106 implements reinforcement learning, e.g., reward-based 112, to learn the binary vector 110.

Vision transformer can include multi-head self-attention layer (MSA) 102, which learns relationships between every two different patches among all the input tokens. There can be h self-attention heads inside the MSA 102. In each self-attention head, the input token $X_i$ is first projected to a query $Q_i$, a key $K_i$, and a value $V_i$ by three different linear transformations. Then, the query $Q_i$ computes the dot products with all the keys K and these dot products are scaled and normalized by the softmax layer to get the attention weights. After that, it outputs the token $Y_i$ by weighted sum of all the values V with the obtained attention weights. The outputs from all heads are concatenated and re-projected by a linear layer into an output token.

Feed-Forward Network (FFN) 104 can include two linear layers which are connected by an activation function, e.g., the Gaussian Error Linear Unit (GeLU) activation function. For each output token $Y_i \in R^D$ from the precedent MSA layer, FFN processes it individually. The first linear layer upgrades its dimension from D to 4D, and the second linear layer downgrades its dimension from 4D to D. Both MSA 102 and FFN 104 are functioning as residual connection.

Vision transformer can also include linear patch embedding and positional encoding. For an image or a video segment, ViT first splits it into several fixed-size patches and embeds them into input tokens with a linear layer. After transforming the original image and video into a series of tokens, the network is no longer capable of being aware of the positional information of the input tokens. Thus the positional embeddings are added to the input tokens right after the patch embedding to learn the positional information of each token.

In an aspect, with respect to MSA and FFN of the vision transformer, for an input sequence N×D, where N is the length of the input sequence and D is the embedding dimension of each input token, the computation complexity of the MSA can be $O(4N D^2+2N^2 D)$, while for the FFN, the computational complexity can be $O(8N D^2)$. As the computational complexity of patch embedding can be neglected compared with the MSA and FFN, the total computational complexity of the ViT can be $O(12N D^2+2N^2 D)$.

In an embodiment, the transformer can be divided into D groups. Here, notation "D" in D groups is not the same notation as in D embedding dimension referred to above. Each group contains a multi-head interpreter and L combinations of the MSA and FFN. Before input to the MSA and FFN, the patch tokens are evaluated by the multi-head interpreter to drop some uninformative patches. The multi-head interpreters can be optimized by reward considering both the efficiency and accuracy. In an embodiment, a multi-head interpreter (also referred to as a policy network or policy module) can have architecture of the MSA layer of a transformer.

In an embodiment, the multi-head interpreter 106 can use a policy token 116 to estimate the importance of the input token. For instance, in vision transformers, image patches can be referred to as tokens, e.g., patch tokens. Along with the patch tokens, the framework can use an additional policy token to estimate the importance to input tokens or patch tokens. The policy token 116 can be learned during training. The multi-head interpreter 106 receives patch tokens 108 and projects them by linear projection 118. In an embodiment, linear projection 118 can be a linear transformation used in standard transformers. Linear projection 118 or transformation is used to transform the patch tokens so that they can operate with (e.g., multiply them with) the policy token 116. For example, policy token can be multiplied with the input tokens (e.g., after linear projection) for obtaining the importance scores in Eq. (1). Policy queries 120 refer to input tokens after linear transformation, e.g., linear transformation of input patch tokens produces policy queries. Policy queries 120 output from the linear projection 118 are combined with the policy token 116 (e.g., by dot product computation) and input to activation functions, e.g., a sigmoid function. Based on the activations, the multi-head interpreter 106 outputs a vector, e.g., a binary vector indicating patch tokens to drop and keep. The framework can hierarchically train the multi-head interpreter based on a pre-trained vision transformer. For example, the policy token 116 can be parametrized and learned during training.

Given a sequence of patch tokens $X \in R^{N \times d}$, e.g., at 108, the framework can drop the uninformative patch tokens by using the multi-head interpreter 106. In an embodiment, the given sequence 108, may already contain the positional information. In an embodiment, an original ViT can be divided evenly into D groups, where each group contains a multi-head interpreter 106 and L blocks which include one MSA layer 102 and one FFN 104. Inside each group, before inputting to the blocks (MSA-FFN), the patch tokens 108 can be evaluated by the multi-head interpreter 106 for the informative score $I_{ij}$, where i and j represent the position of the input token and the group respectively. If $I_{ij}$ is below a defined threshold, e.g., the threshold 0.5, the patch $X_i$ can be completely discarded at $j^{th}$ group and may not be available in the subsequent groups. In an embodiment, the $I_{ij}$ can be obtained by $$I_{ij} = \frac{1}{H}\sum_h \phi(f_q^h(X_i) * f_k^h(P_j)), \quad (1)$$

where $P_j$ is a policy token in the $j^{th}$ multi-head interpreter, H is the number of the heads in the multi-head interpreter, $f_q^h$ and $f_k^h$ are the linear layer at $h^{th}$ head for the patch tokens and the policy token respectively, * represents the dot product and $\phi$ the sigmoid activation function. In an aspect, with a higher threshold, a more efficient model can be achieved, while lowering the threshold can result in a more accurate model. Thus the threshold of $I_{i,j}$ can be regarded as a trade-off factor between accuracy and efficiency.

In an embodiment, a hierarchical training scheme is built on top of a well-trained ViT. In an embodiment of the framework, all of the MSA-FFN blocks in the original vision transformer can be evenly assigned into D groups in the framework, where each group contains L MSA-FFN blocks and one multi-head interpreter. The framework may fix the parameters of the patch embedding layer, positional encoding, and the class token during the training, and focus on the parameters inside each group, e.g., optimizing parameters like policy tokens, parameters in multi-headed self-attention and feedforward network inside each group. In an embodiment, the network groups are optimized in a curriculum learning manner. For example, if the number of groups D is 3, the framework may first optimize groups 1 to 3, then 2 to 3, and finally, the framework may optimize the third group. In an aspect, the interpreter 106 at the early stage may learn to select the patches containing all of the necessary contextual information for the correct final prediction, while the interpreter at later stages could focus more on the part-level information since now each token's information has already gone through global interaction and fusion. The pseudocode for the optimization pipeline is provided below.

In an embodiment, the framework may optimize the multi-head interpreters 106 by using a reinforce method where the reward 112 considers both the efficiency and accuracy, and fine-tune the MSA-FFN blocks 102-104 with gradients computed based on cross-entropy loss.

Formally, during the training phase, given a sequence of patch tokens $X \in R^{N \times d}$ input to the $j^{th}$ multi-head interpreter, the multi-head interpreter generates policies for each input token of dropping or keeping it as Bernoulli distribution by: $\pi_w(u_i|X_i)=I_{ij}^{u_i}*(1-I_{ij})^{1-u_i}$, where $u_i=1$ means to keep the token and $u_i=0$ means to discard the token, $I_{ij}$ is defined in the Equation 1 and $X_i$ denotes the i-th token in the token sequence X. These actions are associated with the reward function:

$$R(u) = \begin{cases} 1-\left(\frac{|u|_0}{N}\right)^2 & \text{if correct,} \\ -\tau & \text{otherwise} \end{cases} \quad (2)$$

where $$\left(\frac{|u|_0}{N}\right)^2$$

measures the percentage of the patches kept, and $\tau$ is the value of penalty for the error prediction which controls the trade-off between the efficiency and the accuracy of the network. This reward function encourages the multi-head interpreter to predict the correct results with as few patch tokens as possible. Then the multi-head interpreter is optimized individually by the expected gradient:

$$\nabla_{W_j}J=E_{u \sim \pi}[A\nabla_{W_j}\Sigma_{i=1}^N \log[I_{ij}u_i+(1-I_{ij})(1-u_i)]], A=R(u)-R(\hat{u}), \quad (3)$$

where $J=E_{u\sim\pi}[R(u)]$ is the expected reward to compute the policy gradient, $W_j$ denotes the parameters of the j-th multi-head interpreter. In an embodiment, the method disclosed herein uses the self-critical baseline $R(\hat{u})$ to reduce the variance of optimization, where $R(\hat{u})$ denotes the maximally probable configuration under the current policy: $u_i=1$ if $I_{ij}>0.5$, and $u_i=0$ otherwise. As the computation of the j-th multi-head interpreter is based on the output tokens of (j−1)-th group, the method disclosed herein may optimize the entire network in a curriculum learning manner. The method may first train the interpreter in the earlier layer, and then fix the interpreter and fine-tune all of the subsequent MSA-FFN blocks. Consider the j-th group for example. For the j-th group, the method may first only train the multi-head interpreter and then fix it while optimizing the subsequent MSA-FFN modules in the j-th, . . . , D-th groups. When the method optimizes the j-th group, the multi-head interpreter in the latter groups can be masked and keep all of the tokens.

By visualizing the informative scores predicted by the multi-head interpreters 106 in different network groups, it can be observed that the redundancy of the input patches is hierarchically reduced at different levels. For those patches that are removed in the precedent groups, the framework may treat the informative score of them as zero. Thus the framework can obtain a sequence of the informative scores from each network group whose length equals the original input sequence length. The framework can rearrange this score sequence and interpolate it back to the size of the input vision content (e.g., image or video). As the range of the informative score is from 0 to 1, a heatmap may be drawn for each network group which interprets that what is redundant for this network group.

In an embodiment, the input patches can be received as one sequence. In an embodiment, for input that includes a video, number of frames can be sampled and split into frame patches. For example, there can be 8 frames in one video segment, which can be split into 1568 frame patches.

By way of example, in an embodiment, for the image recognition task, the vision transformer back-bone can be divided into 3 (D=3) groups, where each group contains 4 (L=4) MSA-FFN modules and one multi-head interpreter. The entire framework can be optimized for D×30 epochs. During every 30 epochs, the framework can optimize the multi-head interpreter for 10 epochs and all of the subsequent MSA-FFN modules for 20 epochs. By way of example, the framework may use a mini-batch size of 32 images per graphic processing unit (GPU) and adopt Adam optimizer with an initial learning rate of 4e-5, which decays by cosine strategy to train the model. For the video understanding task, by way of example, in an embodiment, the framework may set D=1, e.g., select the informative patches at the input level. The framework may train the multi-head interpreter for 5 epochs and then fine-tune the backbone network for 1 epoch. For example, the framework may use a mini-batch size of 8 video segments per GPU and adopt a stochastic gradient descent (SGD) optimizer with an initial learning rate of 2.5e-3 in cosine strategy. Other hyper-parameters can be used.

Figure 2A:
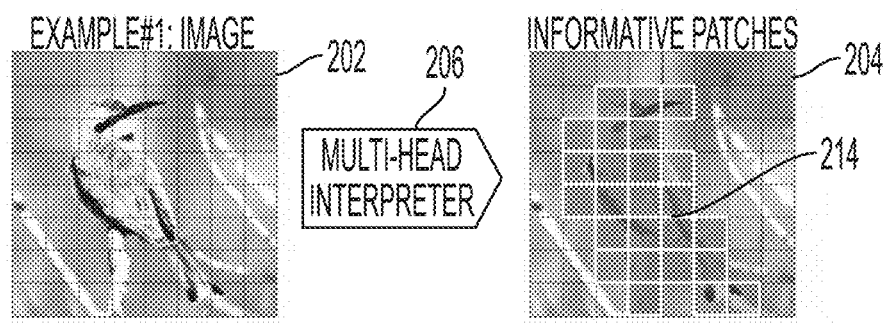
FIGS. 2A and 2B show two examples of redundancy reduction in vision transformers in an embodiment.
Figure 2B:
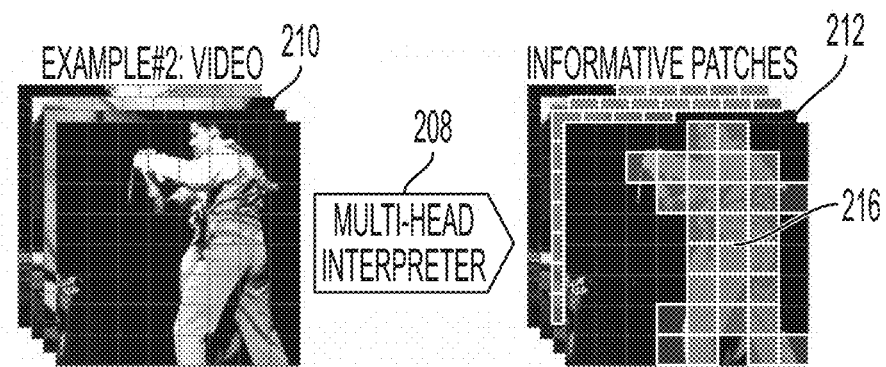

FIGS. 2A and 2B show two examples of redundancy reduction in vision transformers in an embodiment. The multi-head interpreters serve as a module (which can be independent of a type of a model) which are built on top of the existing transformer-based backbones for different tasks, including image recognition and video action recognition. A multi-head interpreter 206 can transform patch tokens of an original image 202 tokens into reduced tokens, e.g., shown by boxes 214 in the image 204. Similarly, a multi-head interpreter 208 can reduce patch tokens of an original video 210 to informative patch tokens 216 shown in the video 212.

Figure 3:
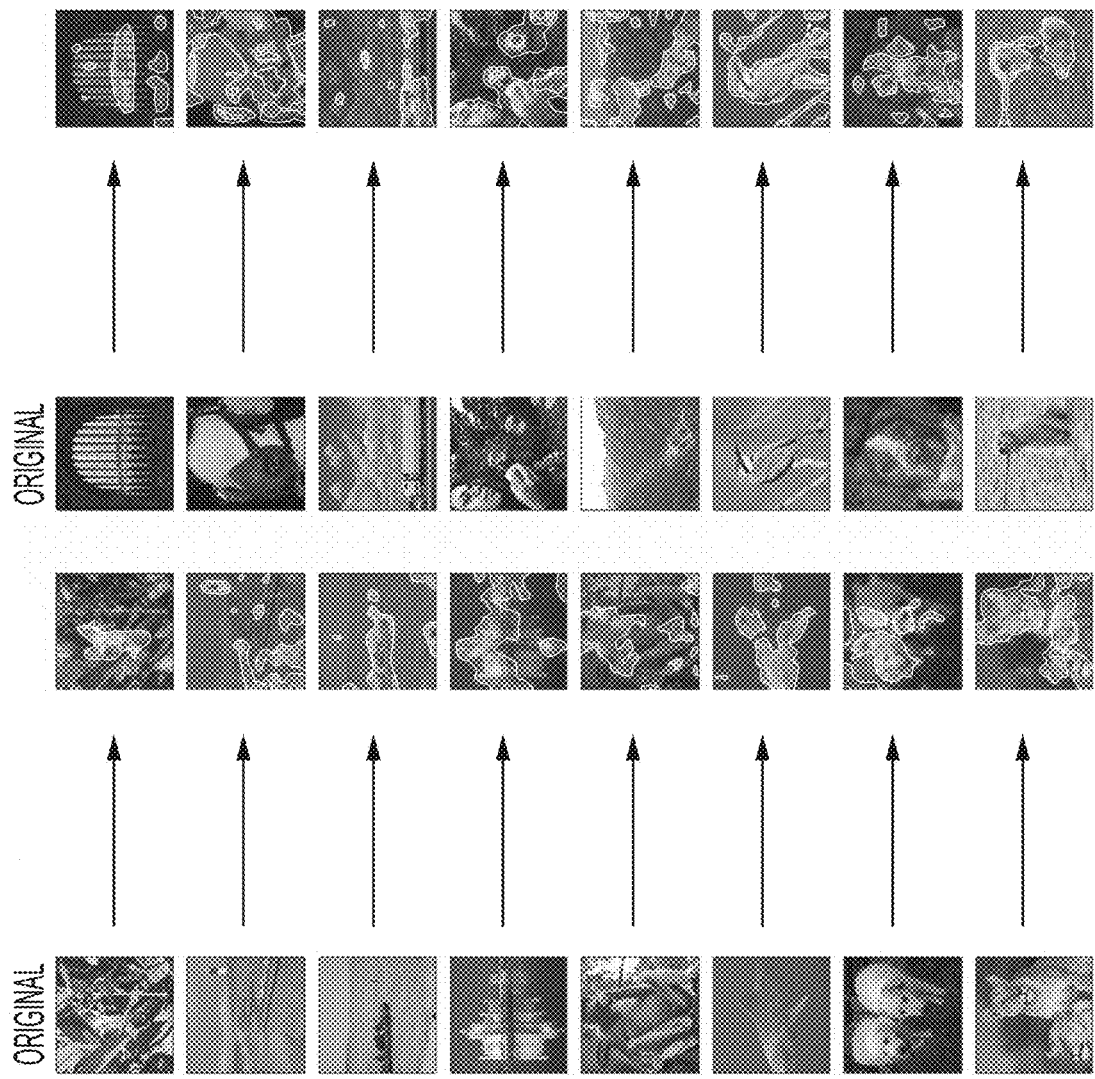
FIG. 3 shows visualized heatmaps which highlight the informative region of the input images.

In an aspect, the framework can interpret where the informative region for the correct prediction is and can localize the salient object on the input images. FIG. 3 shows visualized heatmaps which highlight the informative region of the input images. Highlighted informative regions can be used as interpretation or explanation for the prediction, e.g., object classification. For example, from the third example in the second column, it can be observed that the heatmap generated can combine the pattern of memorability map which detects the truck head. In the example of the shark at the sixth row of the first column, it can also be observed that the framework accurately localizes the fin and the head in the image of a shark, the two most informative features of the shark. Also, examples of dogs and tigers at the seventh and eighth rows demonstrate that the framework can detect the features on the animal face, like eyes, noses, and ears.

Experiments also show that the framework outperforms other methods in weakly-supervised image segmentation, where a task is to predict a precise mask of the objects of interest without pixel-level supervision, where a binary mask serves as the ground-truth label.

Figure 4:
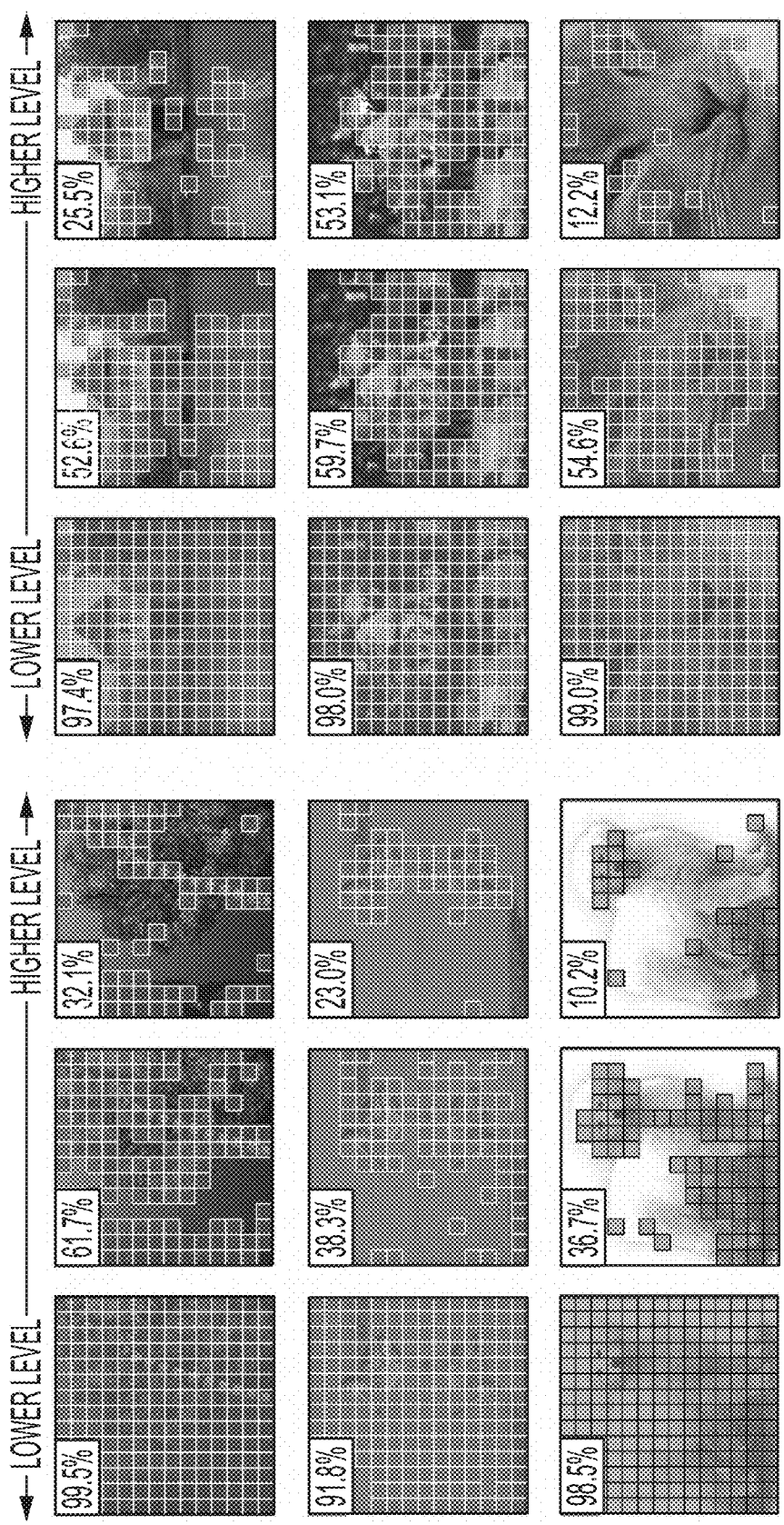
FIG. 4 shows a visualization of the hierarchical redundancy reduction process in an embodiment.

The framework can hierarchically reduce the redundancy of the input patch tokens with both qualitative results and quantitative results. FIG. 4 shows a visualization of the hierarchical redundancy reduction process in an embodiment. The number on the upper-left corner of each image indicates the ratio of the remaining patches. From left to right, it can be seen that the network drops the redundant patches and focuses more on the high-level features of the objects. FIG. 4 visualizes several examples of hierarchically dropping the patch tokens at different groups, where it can be observed that the framework takes almost all of the tokens at the lower level of the network (the first group), then drops the patches on the background and focuses on the entire object of interest at the middle level (the second group). And finally, it focuses on the part-level stuff of the object at the higher level (the third group). For example, the framework can show what is the informative region for the correct prediction of classification. Similarly, with video action recognition, the framework can learn to identify the informative patches among thousands of input patch tokens.

In an embodiment, the framework can serve as a plugin framework, for example, which can include a plugin operation for a wide range of sequence-based vision transformer architectures. For example, a method can be adopted to prune tokens in data-independent transformers. In an embodiment, the framework for interpretability need not require fine-tuning of the original model (e.g., the backbone transformer which includes MSA and FFN). For example, the method of the framework does not alter the weights of the original model, and hence can be convenient to use as a model interpretability method for vision transformers.

In an aspect, the framework and the method thereof may seek to reduce the data-level redundancy. The interpretability-aware redundancy reduction framework for the recent vision transformer, in an embodiment, can hierarchically reduce the computational cost and speeds up the vision transformer effectively with human-understandable trajectories.

A pseudo-code that shows details of a training process of the framework is shown in Algorithm 1. By way of example, D, the number of groups is set to 3. $W_p$ denotes the parameters of the multi-head interpreters, $W_b$ denotes the parameters of the MSA-FFN blocks. For each of the groups, 10 epochs are spent to train the multi-head interpreter and then 20 epochs to train the rest MSA-FFN blocks.

---

Algorithm 1 Optimize multi-head interpreters and MSA-FFN blocks.

---

Input: A token sequence X right after the positional embedding and its label Y.
```
for i ← 1 to D do
    for j ← 1 to 10 do
        for each iteration do
            R ← Reward(X, Y | W_p^{1:i}, W_b)
            Compute_Policy_Gradient(R)
            W_p^i ← Update_Parameters(W_p^i)
        end for
    end for
    for j ← 11 to 30 do
        for each iteration do
            L ← CrossEntropyLoss(X, Y | W_p^{1:i}, W_b)
            Compute_Gradient(L)
            W_b^{1:D} ← Updated_Parameters(W_b^{1:D})
        end for
    end for
end for
```

In an embodiment, the multi-head interpreters can be trained using REINFORCE, which does not require gradients for the backbone network and saves much of computation. Briefly, REINFORCE is a policy gradient algorithm in reinforcement learning. The trained framework can be used or run for prediction, e.g., image and/or video action recognition.

The framework filters the redundant patches and keeps the informative patches which are important for the final prediction. The framework can ease the heavy computational cost for the vision transformer, which could save more energy and reduce the carbon emissions for the industry. The interpretability which emerges in the method of the framework help in understanding what is happening inside the vision transformer.

Figure 5:
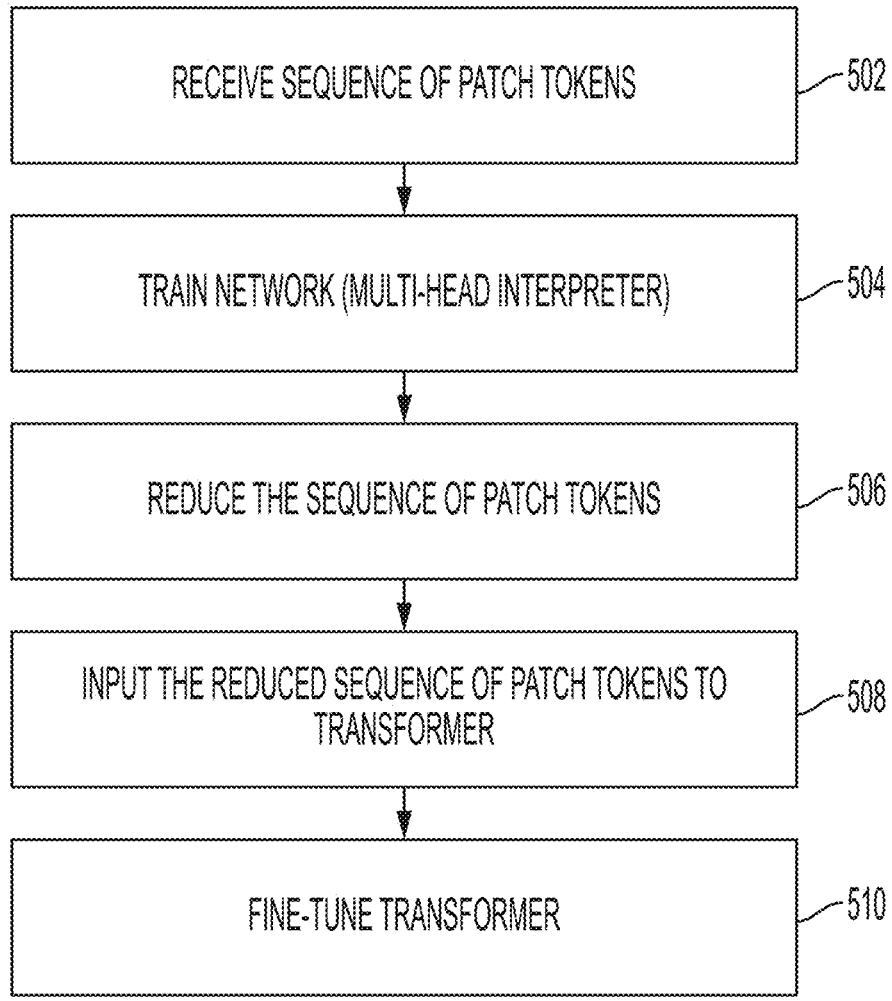
FIG. 5 is a flow diagram illustrating a method in an embodiment.

FIG. 5 is a flow diagram illustrating a method in an embodiment. The method can be implemented on one or more computer processors, for example, including one or more hardware processors. At 502, a sequence of patch tokens representing an image can be received. In an embodiment, the patch of tokens includes positional embeddings. At 504, a module or network can be trained to learn informative patch tokens and uninformative patch tokens in the sequence of patch tokens, in learning to recognizing an object in the image. The network can include a linear layer, where the sequence of patch tokens input to the linear layer is activated or deactivated based on applying an activation function and a policy token.

At 506, the sequence of patch tokens can be reduced by removing the uninformative patch tokens from the sequence of patch tokens. For example, the network can be trained to output a binary vector representing the sequence of patch tokens, which are informative and uninformative.

At 508, the reduced sequence of patch tokens can be passed to or input to an attention-based deep learning neural network. For example, the attention-based deep learning neural network can be a vision transformer. For example, the network can be a multi-headed module connected to the attention-based deep learning neural network.

At 510, the attention-based deep learning neural network can be fine-tuned to recognize the object in the image using the reduced sequence of patch tokens. In an embodiment, training of the network and fine-tuning the attention-based deep learning neural network can be performed together, where parameters learned by the network is used in fine-tuning the attention-based deep learning neural network. In an embodiment, the network can be optimized using reinforcement learning based on the attention-based deep learning neural network's prediction. In an aspect, the trained model can be run or used for image or video action recognition.

Figure 6:
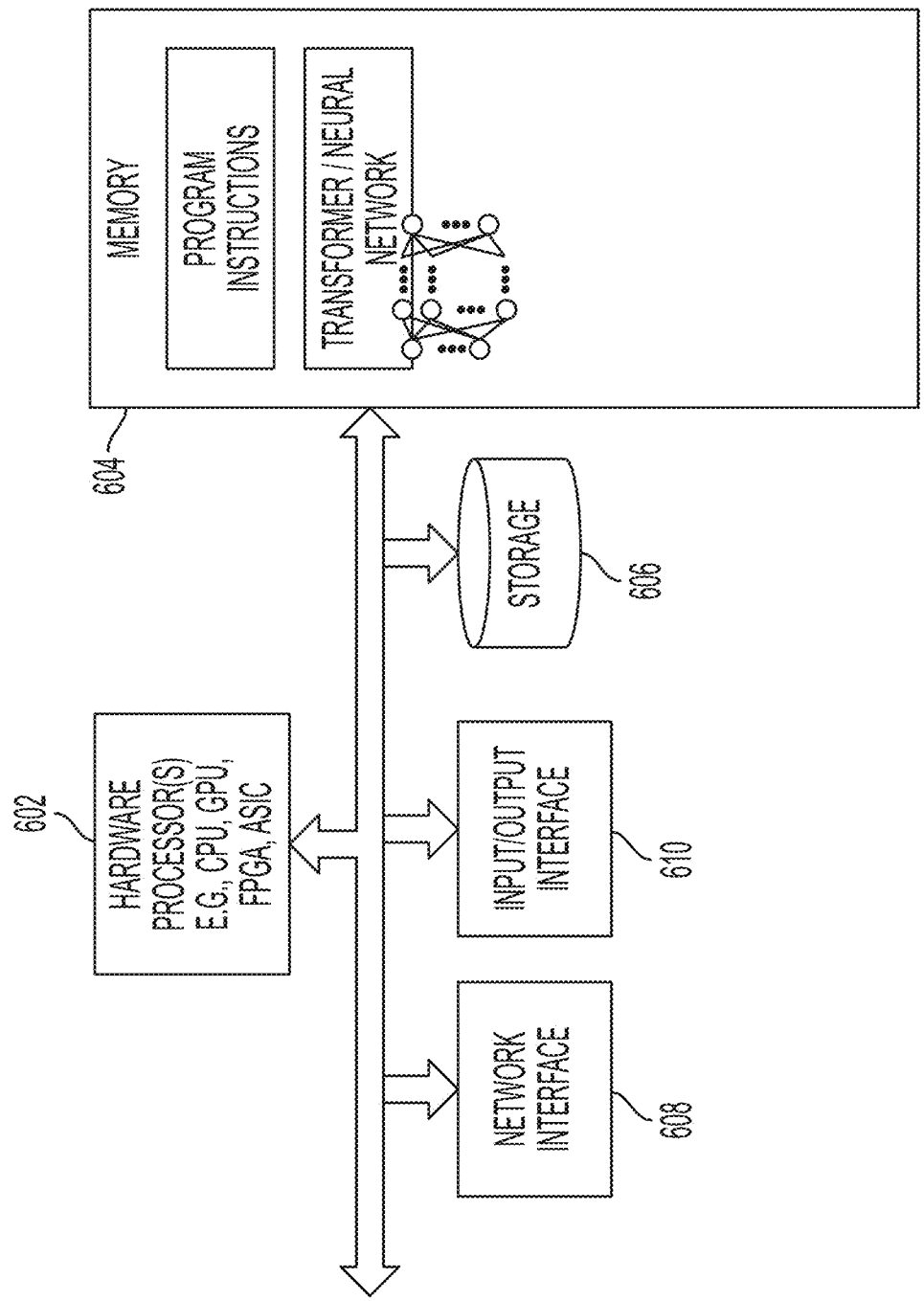
FIG. 6 is a diagram showing components of a system in one embodiment that can perform interpretability-aware redundancy reduction, for example, for vision transformers.

FIG. 6 is a diagram showing components of a system in one embodiment that can perform interpretability-aware redundancy reduction, for example, for vision transformers. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and generate and/or train a model for interpretability-aware redundancy reduction in transformers, e.g., vision transformers. A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. One or more hardware processors 602 may receive input including a sequence of patch tokens representing an image. At least one hardware processor 602 may train a model able to perform interpretability-aware redundancy reduction. In an embodiment, the input sequence patch tokens can be stored in a storage device 606 or received via a network interface 608 from a remote device, and may be temporarily loaded into a memory device 604 for building or generating the model. The learned model may be stored on a memory device 604, for example, for running by one or more hardware processors 602. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

Figure 7:
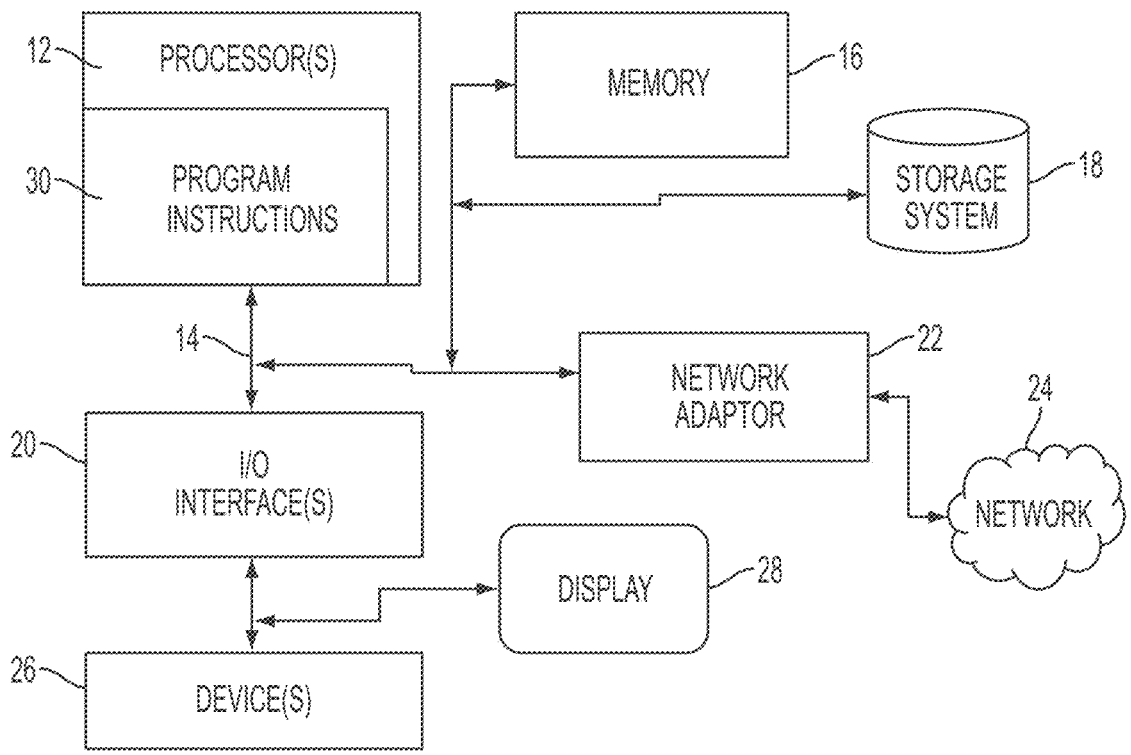
FIG. 7 illustrates a schematic of an example computer or processing system that may implement a system according to one embodiment.

FIG. 7 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
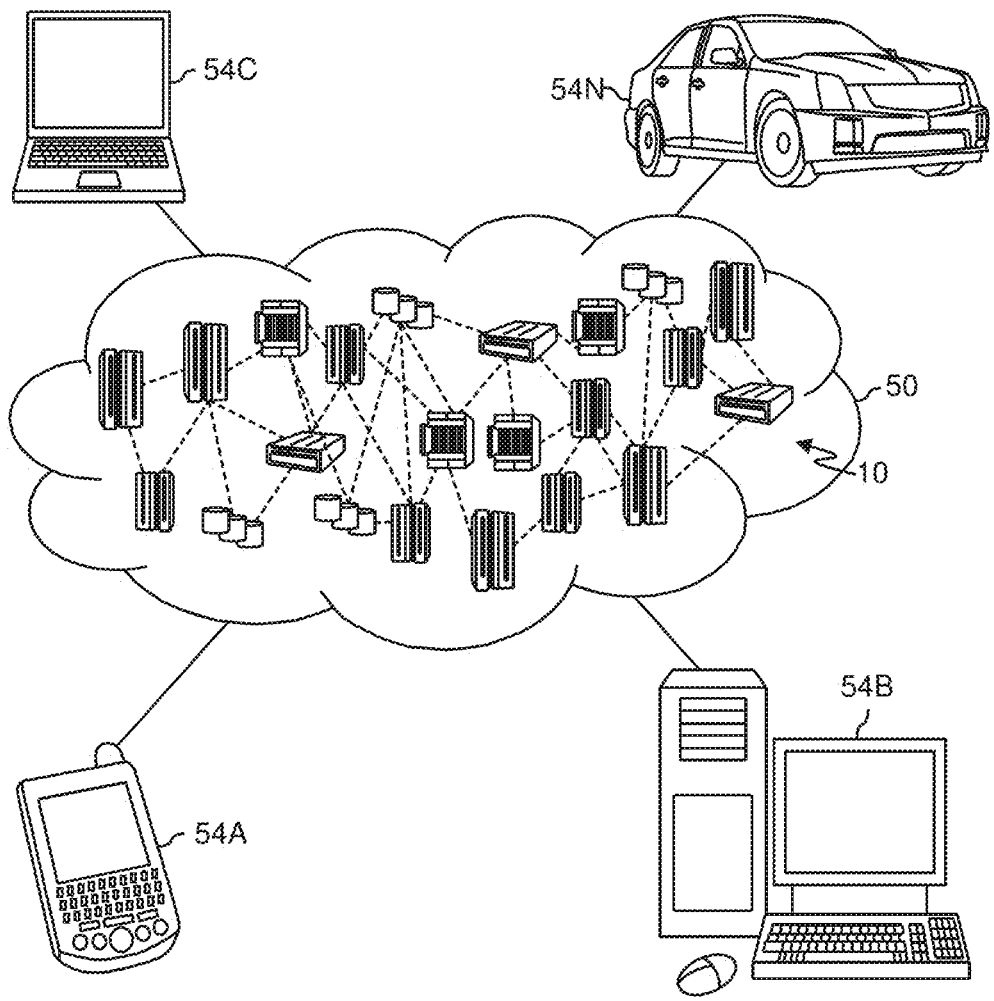
FIG. 8 illustrates a cloud computing environment in one embodiment.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
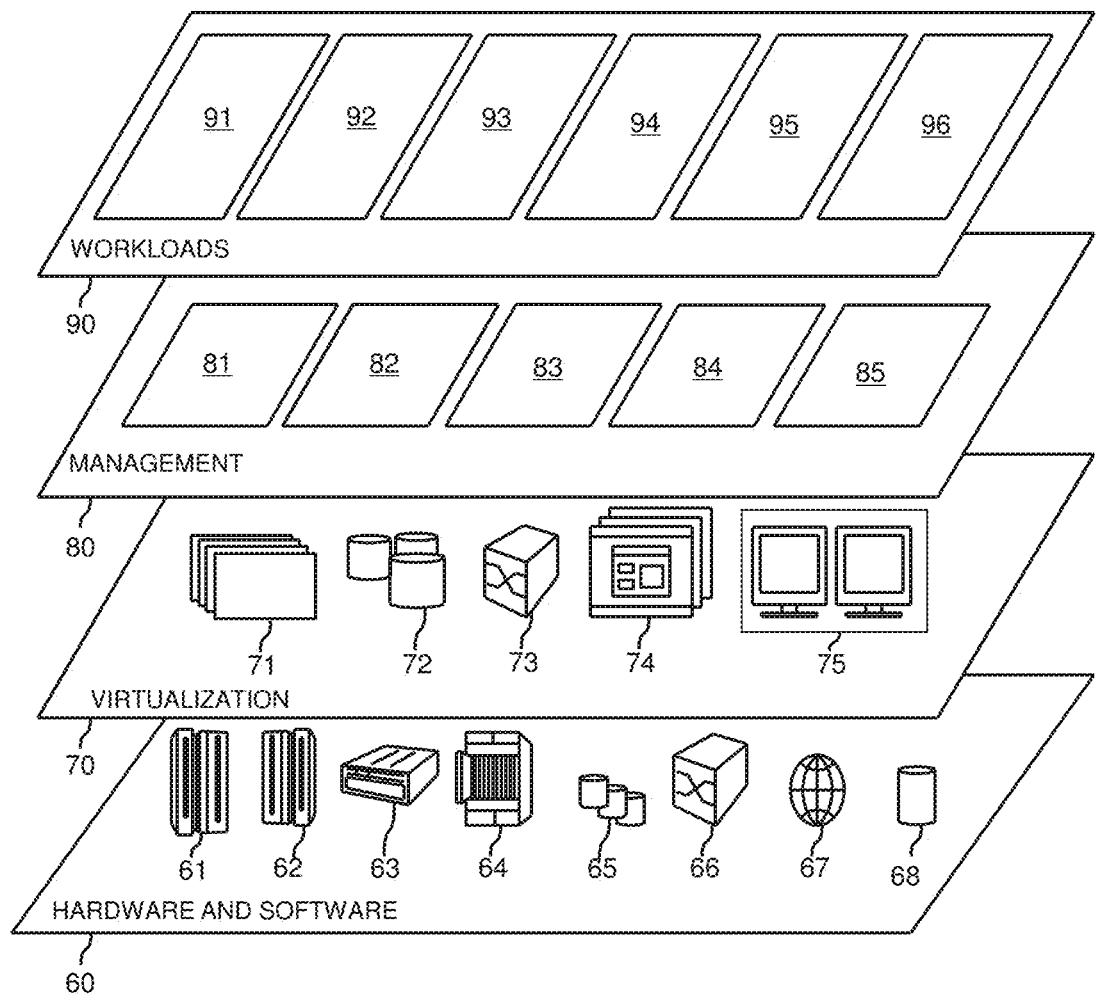
FIG. 9 illustrates a set of functional abstraction layers provided by cloud computing environment in one embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and interpretability-aware redundancy reduction processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
receiving a sequence of patch tokens representing an image;
training a network to learn informative patch tokens and uninformative patch tokens in the sequence of patch tokens, in learning to recognize an object in the image, wherein the network includes a linear layer, wherein the sequence of patch tokens is input to the linear layer and the linear layer outputs a binary vector by applying a policy token to the sequence of patch tokens and feeding result of applying the policy token to the patch tokens into an activation function, the binary vector indicating whether the sequence of patch tokens input to the linear layer is activated or deactivated, wherein a value of the policy token is learned based on reinforcement learning during the training of the network;
reducing the sequence of patch tokens by removing the uninformative patch tokens from the sequence of patch tokens; and
inputting the reduced sequence of patch tokens to an attention-based deep learning neural network;
fine-tuning the attention-based deep learning neural network to recognize the object in the image using the reduced sequence of patch tokens,
wherein the attention-based deep learning neural network is divided into D number of groups, each group in the D number of groups including the network's linear layer and L blocks of multi-head self-attention layer and feed-forward network.

2. The method of claim 1, wherein the network includes a multi-headed module connected to the attention-based deep learning neural network.

3. The method of claim 1, wherein the attention-based deep learning neural network includes a vision transformer.

4. The method of claim 1, wherein the network includes a linear layer, wherein the sequence of patch tokens input to the linear layer is activated or deactivated based on applying an activation function and a policy token.

5. The method of claim 1, wherein training of the network and fine-tuning the attention-based deep learning neural network are performed together, wherein parameters learned by the network is used in fine-tuning the attention-based deep learning neural network.

6. The method of claim 1, wherein the sequence of patch tokens have positional embeddings.

7. The method of claim 1, wherein the network is optimized using reinforcement learning based on a prediction of the attention-based deep learning neural network.

8. A system comprising:
a processor; and
a memory device coupled with the processor;
the processor configured to at least:
receive a sequence of patch tokens representing an image;
train a network to learn informative patch tokens and uninformative patch tokens in the sequence of patch tokens, in learning to recognize an object in the image, wherein the network includes a linear layer, wherein the sequence of patch tokens is input to the linear layer and the linear layer outputs a binary vector by applying a policy token to the sequence of patch tokens and feeding result of applying the policy token to the patch tokens into an activation function, the binary vector indicating whether the sequence of patch tokens input to the linear layer is activated or deactivated, wherein a value of the policy token is learned based on reinforcement learning during the training of the network;
reduce the sequence of patch tokens by removing the uninformative patch tokens from the sequence of patch tokens; and
input the reduced sequence of patch tokens to an attention-based deep learning neural network;
fine-tune the attention-based deep learning neural network to recognize the object in the image using the reduced sequence of patch tokens,
wherein the attention-based deep learning neural network is divided into D number of groups, each group in the D number of groups including the network's linear layer and L blocks of multi-head self-attention layer and feed-forward network.

9. The system of claim 8, wherein the network includes a multi-headed module connected to the attention-based deep learning neural network.

10. The system of claim 8, wherein the attention-based deep learning neural network includes a vision transformer.

11. The system of claim 8, wherein the network includes a linear layer, wherein the sequence of patch tokens input to the linear layer is activated or deactivated based on applying an activation function and a policy token.

12. The system of claim 8, wherein the processor is configured to train the network and fine-tune the attention-based deep learning neural network together, wherein parameters learned by the network is used in fine-tuning the attention-based deep learning neural network.

13. The system of claim 8, wherein the sequence of patch tokens have positional embeddings.

14. The system of claim 8, wherein the network is optimized using reinforcement learning based on a reward determined based on a prediction of the attention-based deep learning neural network.

15. A computer program product comprising a computer readable storage medium having program instructions embodied therewith, the program instructions readable by a device to cause the device to:
receive a sequence of patch tokens representing an image;
train a network to learn informative patch tokens and uninformative patch tokens in the sequence of patch tokens, in learning to recognize an object in the image, wherein the network includes a linear layer, wherein the sequence of patch tokens is input to the linear layer and the linear layer outputs a binary vector by applying a policy token to the sequence of patch tokens and feeding result of applying the policy token to the patch tokens into an activation function, the binary vector indicating whether the sequence of patch tokens input tothe linear layer is activated or deactivated, wherein a value of the policy token is learned based on reinforcement learning during the training of the network;
reduce the sequence of patch tokens by removing the uninformative patch tokens from the sequence of patch tokens; and
input the reduced sequence of patch tokens to an attention-based deep learning neural network;
fine-tune the attention-based deep learning neural network to recognize the object in the image using the reduced sequence of patch tokens, wherein the attention-based deep learning neural network is divided into D number of groups, each group in the D number of groups including the network's linear layer and L blocks of multi-head self-attention layer and feed-forward network.

16. The computer program product of claim 15, wherein the network includes a multi-headed module connected to the attention-based deep learning neural network.

17. The computer program product of claim 15, wherein the attention-based deep learning neural network includes a vision transformer.

18. The computer program product of claim 15, wherein the network includes a linear layer, wherein the sequence of patch tokens input to the linear layer is activated or deactivated based on applying an activation function and a policy token.

19. The computer program product of claim 15, wherein the device is caused to train the network and fine-tune the attention-based deep learning neural network together, wherein parameters learned by the network is used in fine-tuning the attention-based deep learning neural network.

20. The computer program product of claim 15, wherein the device is caused to optimize the network using reinforcement learning based on a reward determined based on a prediction of the attention-based deep learning neural network.

\* \* \* \* \*